L. L. HILL.
AIRSHIP LIFE PRESERVER.
APPLICATION FILED JUNE 6, 1912.
1,042,349.
Patented Oct. 22, 1912.
2 SHEETS—SHEET 1.
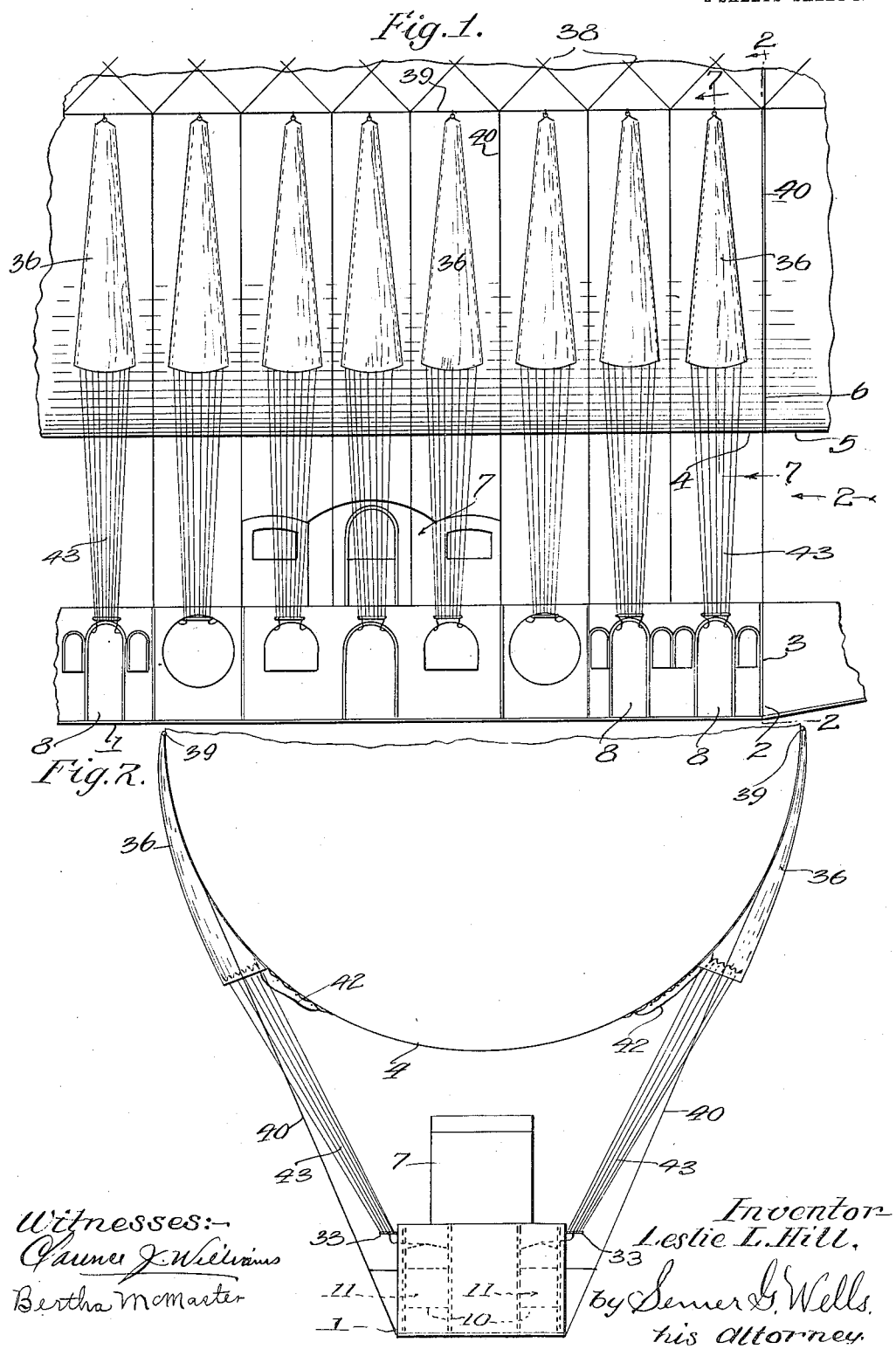

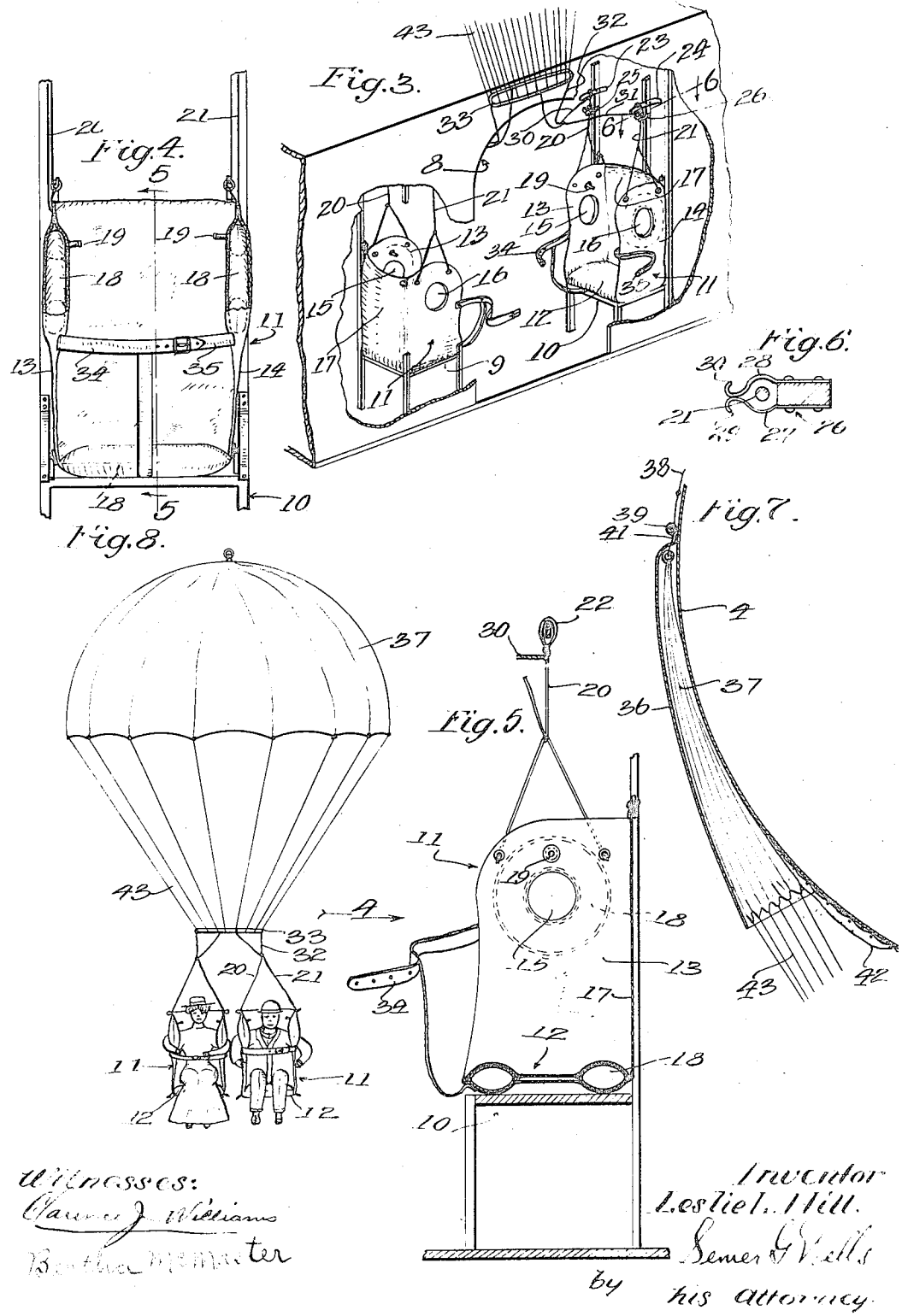

UNITED STATES PATENT OFFICE.

LESLIE L. HILL, OF LOS ANGELES, CALIFORNIA.

AIRSHIP LIFE-PRESERVER.

1,042,349.   Specification of Letters Patent.   Patented Oct. 22, 1912.

Application filed June 6, 1912. Serial No. 702,076.

*To all whom it may concern:*

Be it known that I, LESLIE L. HILL, a citizen of the United States, residing at Los Angeles, county of Los Angeles, State of California, have invented a new and useful Airship Life-Preserver, of which the following is a specification.

My object is to produce a safety device which may be put on and worn by a passenger on an airship, or the like, so that in case of accident the passenger may jump free of the airship and safely descend; and my invention consists of the novel features herein shown, described and claimed.

In the drawings—Figure 1 is a fragmentary side elevation of an airship showing a plurality of my airship life preservers in position for use. Fig. 2 is a fragmentary end elevation of an intermediate section of the airship, the view being taken on the line 2—2 of Fig. 1, that is, upon a line where the sections join. Fig. 3 is a fragmentary perspective showing the entry to the passenger car with the life preserver harnesses in the seats ready for use. Fig. 4 is a front elevation of one of the seats as seen looking in the direction indicated by the arrow 4 in Fig. 5. Fig. 5 is a vertical cross section on the line 5—5 of Fig. 4. Fig. 6 is a horizontal sectional detail showing a plan of one of the spring clips and taken on the line 6—6 of Fig. 3. Fig. 7 is a vertical cross-sectional detail showing a parachute frangibly held in a sheath, the view being taken on the lines 7—7 of Fig. 1 and on a plane parallel with Fig. 2. Fig. 8 is a view in elevation showing two passengers who have jumped free of the airship and are descending under the protection of the parachute.

Referring to the drawings in detail: the passenger car may be made up in sections 1 and 2, said sections 1 and 2 being joined on the line 3, and the gas bag may be made up in sections 4 and 5, butting together on the line 6, so that when the section 2 of the car and the section 5 of the gas bag are removed an end view looking in the direction indicated by the arrow on the line 2—2 will appear substantially as shown in Fig. 2. The pilot and machinery house 7 is mounted on top of section 1 of the car. The passenger car section 1 has door openings 8, and seats 9 and 10 are placed facing each other, one on each side of a door opening 8. An airship life preserver harness 11 is placed upon each seat and the details of this harness are as follows: A canvas case is made up to form the seat portion 12 and the side portions 13 and 14 having armholes 15 and 16, and the back portion 17 extending upwardly from the seat portion and connecting the rear edges of the side portions 13 and 14. Air bags 18 are inserted in the seat portion 12 and in the side portions 13 and 14 around the armholes 15 and 16, said air bags being connected together and an air valve 19 is located above the armhole 15 so that the passenger may insert the stem of the air-valve in his mouth and inflate the air bags to the desired extent. The supporting cords 20 and 21 extend upwardly from the side portions 13 and 14 and have loops 22 upon their upper ends. Arms 23 and 24 extend forwardly from the wall above the seats and spring clips 25 and 26 extend forwardly below the arms 23 and 24. The loops 22 are placed upon the arms 23 and 24 and the cords 20 and 21 are pressed backwardly into the clips 25 and 26, so that the arms 23 and 24 will sustain a downward pull, and so that when the passenger is in position in the harness and raises the harness from the seat the cords 20 and 21 will pull out of the clips 25 and 26 and the loops 22 will pass free of the arms 23 and 24. The clips 25 and 26 are substantially alike and each comprises leaf springs 27 and 28 rigidly mounted at their rear ends and pressing together near their forward ends, the extreme forward ends 29 and 30 being turned outwardly to form an entrance between the springs so that the cord 21 will snap in and out between the springs. Cords 30 and 31 lead through the loops 22 and are joined together and a single cord 32 leads from the junction to the parachute ring 33.

In Fig. 3 I have shown two harnesses connected to a single parachute. Straps 34 and 35 extend forwardly from the centers of the side portions 13 and 14 and pass around the passenger and secure the harness to the passenger. The passenger sits upon the seat portion 12 and places the arms through the armholes 15 and 16 and secures the straps 34 and 35 together so as to secure the harness to the passenger ready for instant use in case of accident.

Strips of canvas 36 are secured to the gas bag 4, so as to form sheaths for the parachute covers 37, said sheaths being open at their lower ends but otherwise closed except for a very small hole at the upper end, so as to protect the parachute from sun and rain. The netting 38 covers the upper half of the gas bag and a rope 39 forms the lower edge of the netting. The ropes 40 extend from the rope 39 and are attached to the bottom of the car 1 so as to support the car. The parachutes 37 are inserted upwardly into the sheaths 36 and frangible cords 41 are connected to the tips of the parachutes and pass through small openings in the upper ends of the sheaths 36 and the upper ends of the cords 41 are attached to the rope 39. The lower edge of each parachute cover 37 is connected at one side to the gas bag netting by frangible cords 42, so that when the parachute pulls out of the sheath the cords 42 will hold one side of the cover and pull that side of the cover toward the gas bag while the remainder of the parachute cover is being pulled downwardly and outwardly, thereby starting the parachute to open. The usual cords 43 are connected to the ribs of the parachute cover and to the ring 33.

It is obvious that harness might be provided for each parachute but I prefer to provide two harnesses for each parachute, so that the passengers will go in pairs in order that one passenger may assist the other and in order that only half as many parachutes will be required.

The cords 32 pass from the harness out through the upper part of the door opening 8 and the parachute ring 33 is mounted or located upon the wall outside of and above the door and the cords 43 are long enough to reach from this ring 33 to the parachute cover 37 when the cover is in the sheath 36. Whenever, for any reason, the passengers desire to leave the car, they will simply rise from the seats 9 and 10, carrying the harnesses with them, pass through the door openings 8, and jump free of the car. When the weight of the passenger, (or passengers,) comes upon the parachute, the frangible cords 41 will break, the parachutes will start downwardly out of the sheaths 36, the frangible cords 42 will pull the near sides of the parachute covers toward the gas bag and start to open the parachutes and the cords 42 will break and the passengers will descend under the protection of the parachutes. If the passengers light upon the ground the air cushions will protect them from injurious impact, and if they land in water the air bags will cause them to float.

The details of construction may be varied in many ways without departing from the spirit of my invention as set up in the following claims.

I claim—

1. In an airship life preserver, a sheath open at the bottom; a parachute cover mounted in the sheath; frangible means connected to the tip of the folded parachute cover, and frangible means connected to one side of the lower edge of the parachute cover, so that when the parachute cover is pulled downwardly out of the sheath the parachute will start to open before the last mentioned frangible cords break.

2. The combination with an airship, having a gas bag and netting and a passenger car, of a parachute sheath formed upon the gas bag and open at its lower end; a parachute adapted to be inserted upwardly into the sheath; frangible means holding the parachute in the sheath; frangible means connecting the lower edge of one side of the parachute cover to the airship; a harness adapted to be put on and worn by a passenger; and a connection between the harness and the parachute, so that when the passenger jumps free of the airship the parachute will be disconnected and forced open as it is pulled out of the sheath.

LESLIE L. HILL.

Witnesses:
JOHN W. HUNTSBERGER,
BERTHA McMASTER.